(12) United States Patent
Cunkle et al.

(10) Patent No.: US 6,336,482 B1
(45) Date of Patent: Jan. 8, 2002

(54) AUTOMOTIVE FUEL TANK FILL ASSEMBLY

(75) Inventors: Daniel Paul Cunkle, Jonesville; Larry Martin Vandervoort, Spring Arbor; David John Gabbey, Pinckney, all of MI (US)

(73) Assignee: Pilot Industries, Inc., Dexter, MI (US)

( * ) Notice: Subject to any disclaimer, the term of this patent is extended or adjusted under 35 U.S.C. 154(b) by 0 days.

(21) Appl. No.: 09/702,622

(22) Filed: Oct. 31, 2000

(51) Int. Cl.[7] ................................................. B65B 1/04
(52) U.S. Cl. ...................... 141/350; 141/301; 220/86.2; 220/DIG. 33
(58) Field of Search ................................ 141/348, 349, 141/350, 301; 220/86.2, DIG. 33

(56) References Cited

U.S. PATENT DOCUMENTS 1,982,879 A  * 12/1934  Overbury
3,730,216 A  *  5/1973  Arnett et al.
5,732,840 A  *  3/1998  Foltz .......................................

* cited by examiner

Primary Examiner—Steven O. Douglas
(74) Attorney, Agent, or Firm—Gifford, Krass, Groh, Sprinkle, Anderson & Citkowski, P.C.

(57) ABSTRACT

An automotive fuel tank fill assembly for a fuel tank is disclosed having a fuel fill tube with a first end adapted to receive fuel and a second end open to the fuel tank. The fill tube includes a spiral indentation formed around its first end so that the spiral indentation forms both an external and internal thread at the first end of the tube. An inlet valve housing containing a normally closed inlet valve has an external thread. This external thread is dimensioned to threadably engage the internal thread on the fill tube while a latch and detent mechanism locks the inlet valve housing to the fill tube at a predetermined rotational position. Similarly, a mount housing includes an internal thread which threadably engages the external thread on the fill tube. The mount housing includes a locking tab which engages the detent formed on the fill tube at a predetermined rotational position of the mount housing relative to the fill tube.

10 Claims, 3 Drawing Sheets

AUTOMOTIVE FUEL TANK FILL ASSEMBLY

BACKGROUND OF THE INVENTION

I. Field of the Invention

The present invention relates to an automotive fuel tank fill assembly.

II. Description of the Prior Art

In conventional automotive vehicles, a fuel tube has one end adapted to receive fuel and a second end open to the fuel tank. The first end of the fill tube, in turn, is secured to an automotive body.

A normally closed inlet flapper door is operatively coupled with the first end of the fuel tube which allows a conductive path from the nozzle to the filler tube and also prevents a leaded nozzle from filling. These previously known inlet flapper doors, however, have typically been secured to the automotive body fluidly in series with the fill tube.

While these previously known fill tubes and inlet flapper doors have performed satisfactorily, they have been unnecessarily complex in both their construction as well as their assembly to the automotive vehicle. As such, the fuel tank fill assembly for the automotive vehicle has proven unduly expensive in practice. Additionally, they have not satisfactorily prevented the escape of fuel vapors into the atmosphere.

SUMMARY OF THE PRESENT INVENTION

The present invention provides an automotive fuel tank fill assembly for a fuel tank which overcomes all of the abovementioned disadvantages of the previously known devices.

In brief, the fuel tank fill assembly of the present invention includes a fuel fill tube having, a first end adapted to receive fuel and a second end open to the fuel tank. The fill tube includes a spiral indentation formed around its first end. The spiral indentation forms both an internal and external thread at the first end of the tube.

The fuel tank fill assembly further includes an inlet valve housing which contains a normally closed inlet valve. This valve prevents fuel vapor from escaping to the atmosphere when closed via a sealed flapper door mechanism. This in let valve housing includes also an external thread dimensioned to threadably engage the internal thread on the fill tube. Additionally, an outwardly protruding latch on the inlet valve housing engages an inwardly protruding detent on the fill tube in order to rotationally lock the inlet valve housing to the fill tube at a predetermined rotational position relative to each other.

The fuel tank assembly further includes a mount housing which secures the fill tube to the automotive vehicle and, optionally, contains a fill valve. The mount housing includes an internal thread which is dimensioned to threadably engage the external thread on the fill tube. Additionally, an inwardly protruding tab on the mount housing engages the detent on the fill tube to lock the mount housing to the fill tube at a predetermined rotational position relative to each other.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
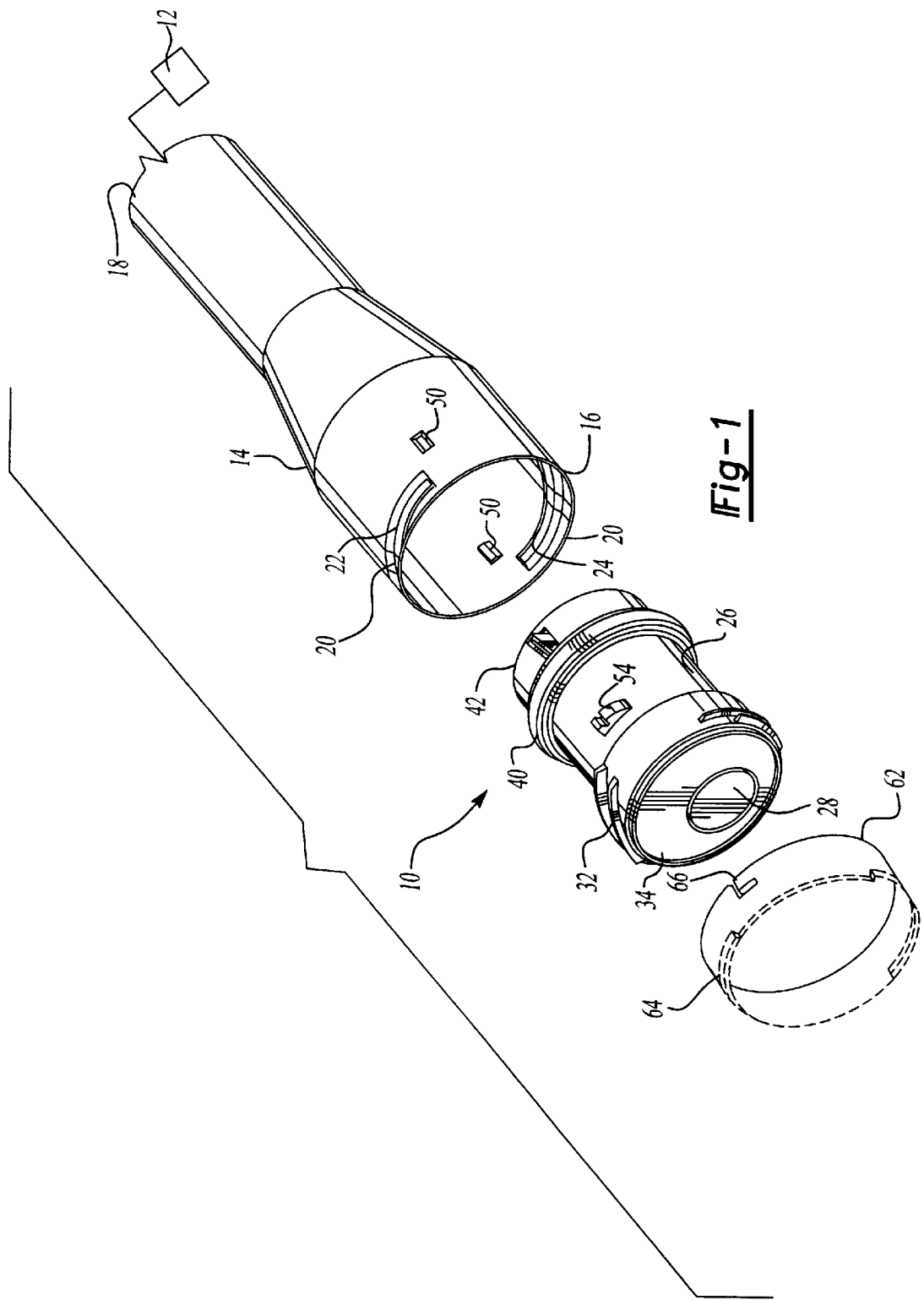
FIG. 1 is an exploded view illustrating a preferred embodiment of the present invention.

With reference first to FIG. 1, a preferred embodiment of the automotive fuel tank fill assembly 10 of the present invention is there shown for use with a fuel tank 12 (illustrated diagrammatically). The fuel tank fill assembly 10 includes a fill tube 14 having a first end 16 adapted to receive fuel and a second end 18 fluidly connected with the fuel tank 12.

The fill tube 14 is tubular and cylindrical in shape and includes at least one spiral indentation 20 adjacent its first end 16. This spiral indentation 20 forms both an external thread 22 as well as an internal thread 24.

Figure 4:
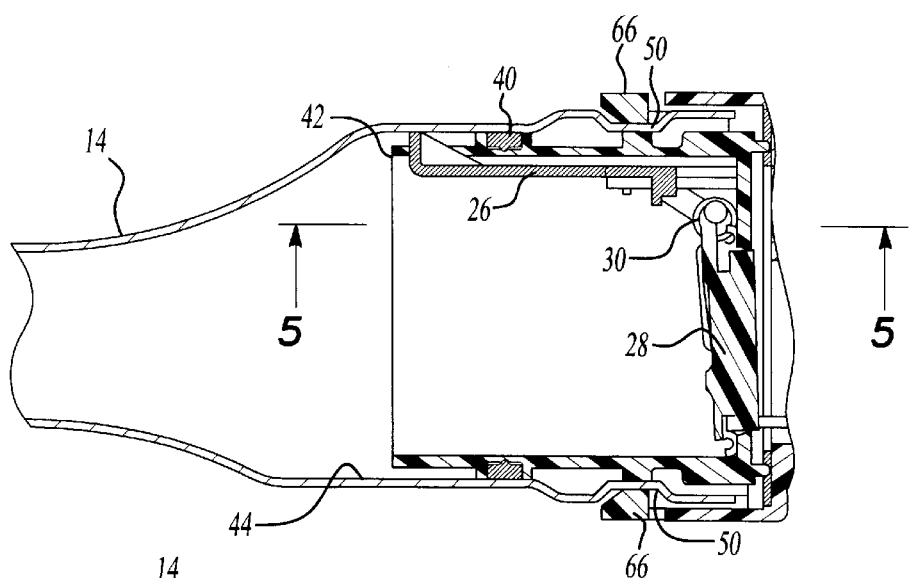
FIG. 4 is a longitudinal sectional view of the preferred embodiment of the present invention.
Figure 5:
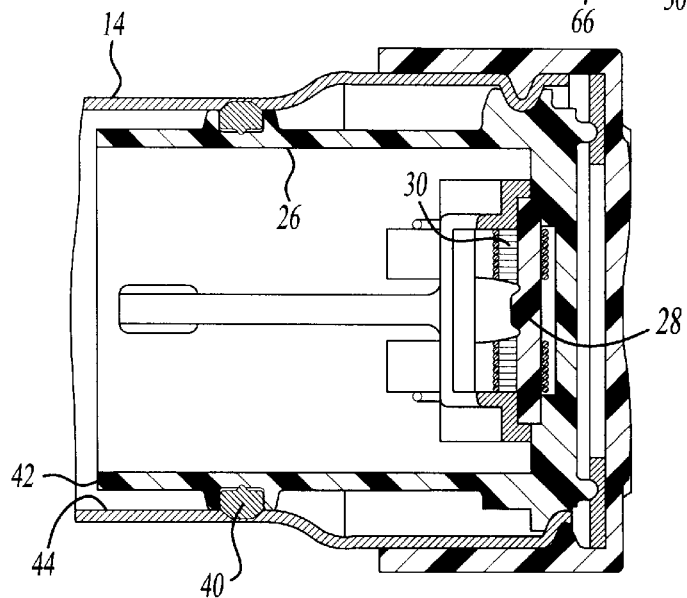
FIG. 5 is a sectional view taken substantially along, line 5—5 in FIG. 4.

Referring now to FIGS. 1, 4 and 5, the fuel tank fill assembly 10 further includes an inlet valve housing 26 which is generally tubular and cylindrical in shape. Preferably, the inlet valve housing 26 is of a one piece construction and is preferably made from a plastic material.

The inlet valve housing 26 includes a normally closed inlet valve 28. This inlet valve 28 is retained in a normally closed position by a spring 30 (FIGS. 4 and 5) and serves to minimize the escape of fuel vapors from the fuel tank 12 (FIG. 1) through the end 16 of the fill tube 14.

Referring now especially to FIGS. 1 and 4, the inlet valve housing 26 includes an external thread 32 adjacent its outer end 34. This external thread 32, furthermore, is dimensioned to threadably engage the internal threads 24 on the fill tube 14.

An annular fluid and vapor seal 40 is mounted to and around the inlet valve housing 26 adjacent its other end 42. The seal 40, which may be constructed of any conventional resilient seal material, is dimensioned so that, as the internal threads 32 on the inlet valve housing, 26 threadably engage the internal threads 24 on the fill tube 14 to the position shown in FIGS. 4 and 5, the seal 40 sealingly engages an inner periphery 44 of the fill tube 14 thus fluidly sealing, the outer periphery of the inlet valve housing 26 to the fill tube 14.

Figure 3:
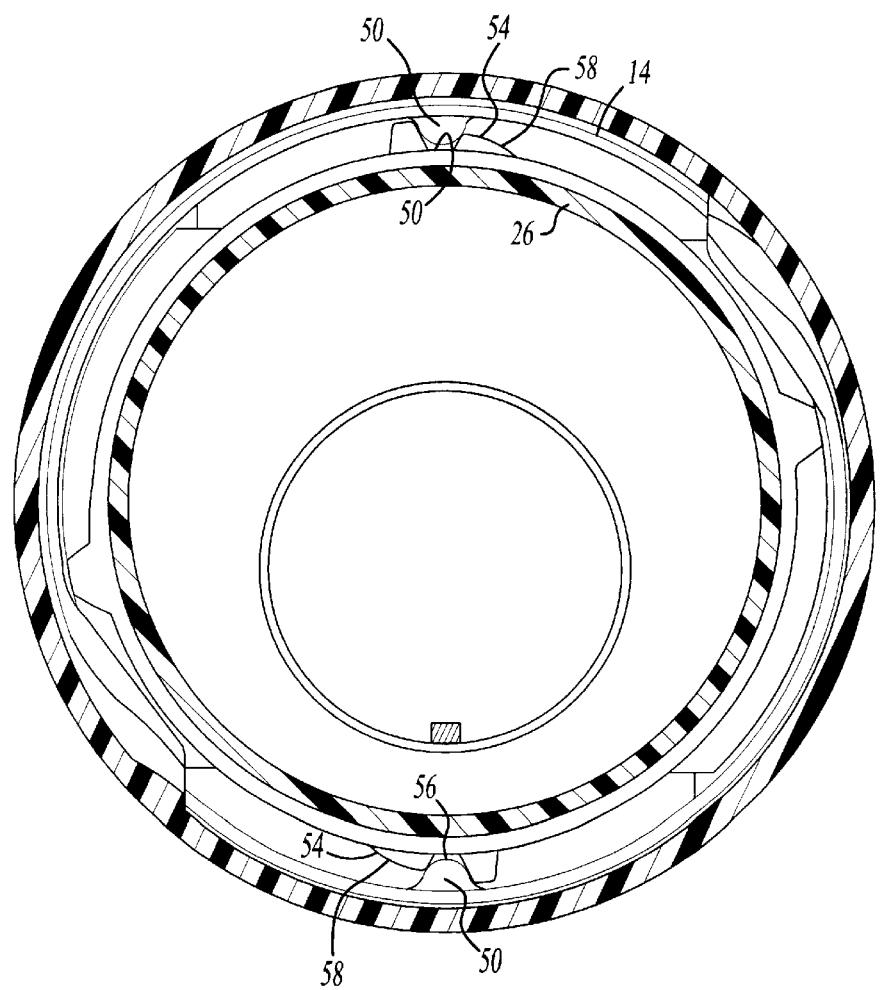
FIG. 3 is a sectional view taken substantially along line 3—3 in FIG. 2 and enlarged for clarity.

With reference now to FIGS. 1 and 3, the fill tube 14 includes at least one, and preferably two diametrically opposed, radially inwardly projecting detents 50. These detents 50 are preferably formed by stamping or sizing and are positioned axially adjacent the spiral indentation 22 on the fill tube 14.

The inlet valve housing 26, in turn, includes a pair of diametrically opposed and radially outwardly extending latches 54 wherein each latch includes a notch 56. One side of each latch 54 includes a ramp 58 so that, as the inlet valve housing 26 is rotated into the fill tube 14 to a predefined position, the ramp 58 on each latch 54 resiliently flexes the inlet valve housing 26 radially inward until the detents 50 register with and resiliently nest in the notches 56. In doing so, the cooperation between the latch 54 and detents 50 lock the inlet valve housing 26 to the fill tube 14 at a predefined rotational position.

Figure 2:
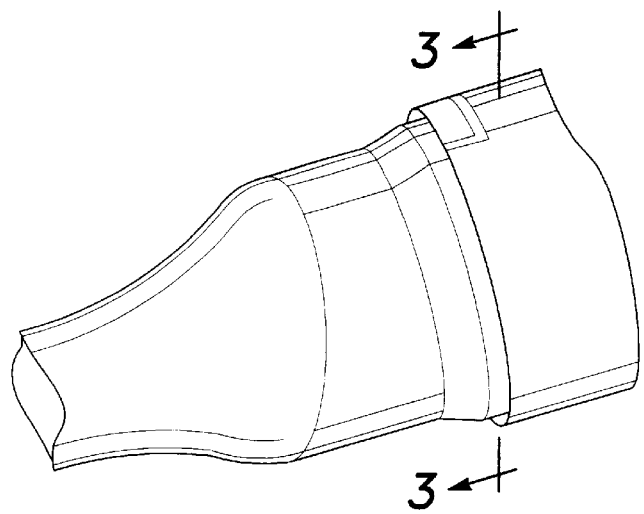
FIG. 2 is an elevational view illustrating the preferred embodiment of the present invention.

With reference now to FIGS. 1, 2 and 4, the fuel tank fill assembly further includes a mount housing 60 which is secured in any conventional fashion to an automotive vehicle body (not shown). The mount housing 60, however, includes a tubular end 62 having internal threads 64 dimensioned to threadably engage the external threads 22 on the fill tube 14.

An inwardly protruding locking tab 66 is also preferably integrally formed with the mount housing 60. The mount housing together with its one piece locking tab 66 is formed of a resilient material, such as plastic. Thus, as the mount housing is threadably mounted over the vent tube 14 to a predetermined position, the locking tabs 66 engage the detents 50, as best shown in FIG. 4, thus locking the mount housing 60 to the fill tube 14 at the predetermined rotational position.

In practice, the mount housing 60 will optionally contain a fill valve.

From the foregoing, it can be seen that fuel tank fill assembly of the present invention provides a simple and yet effective fuel tank fill assembly for automotive vehicles.

Having described my invention, however, many modifications thereto will become apparent to those skilled in the art to which it pertains without deviation from the spirit of the invention as defined by the scope of the appended claims.

We claim:

1. An automotive fuel tank fill assembly for a fuel tank comprising:

a fuel fill tube having a first end adapted to receive fuel and a second end open to the fuel tank, said fill tube having a spiral indentation formed about said first end of said fill tube so that said spiral indentation forms both an external thread at said first end of said tube and an internal thread at said first end of said tube, an inlet valve housing containing a normally closed inlet flapper door, said inlet valve housing having an external thread dimensioned to threadably engage said internal thread on said fill tube, and a mount housing, said mount housing having an internal thread dimensioned to threadably engage said external thread on said fill tube.

2. The invention as defined in claim I and comprising means for locking said inlet valve housing to said fill tube at a predefined rotational position of said inlet valve housing relative to said fill tube.

3. The invention as defined in claim 2 wherein said locking means comprises a detent formed on said fill tube and a latch attached to said inlet valve housing, said latch engaging said detent at said predefined rotational position and preventing further rotation of said inlet valve housing relative to said fill tube.

4. The invention as defined in claim 3 wherein said detent comprises an indentation on said fill tube and wherein said latch comprises a radially outwardly facing notch on said inlet valve housing.

5. The invention as defined in claim 4 wherein said latch and said inlet valve housing are of a one piece construction.

6. The invention as defined in claim 3 and comprising means for locking said mount housing to said fill tube at a predetermined rotational position of said mount housing relative to said fill tube.

7. The invention as defined in claim 6 wherein said locking means comprises a latch attached to said mount housing, said latch on said mount housing engaging said detent at said predetermined rotational position and preventing further rotation of said mount housing relative to said fill tube.

8. The invention as defined in claim 7 wherein said latch on said mount housing comprises a radially inwardly projecting tab on said mount housing.

9. The invention as defined in claim 8 wherein said tab and said mount housing are of a one piece construction.

10. The invention as defined in claim 8 wherein a scaled inlet flapper door minimizes the escape of fuel vapors when in a normally closed position.

\* \* \* \* \*

UNITED STATES PATENT AND TRADEMARK OFFICE
CERTIFICATE OF CORRECTION

PATENT NO. : 6,336,482 B1
DATED : January 8, 2002
INVENTOR(S) : Daniel Paul Cunkle et al.

It is certified that error appears in the above-identified patent and that said Letters Patent is hereby corrected as shown below:

Column 4,
Line 37, replace "scaled" with -- sealed --.

Signed and Sealed this

First Day of October, 2002

Attest:

JAMES E. ROGAN
Attesting Officer
Director of the United States Patent and Trademark Office